United States Patent [19]

Grossman

[11] 4,033,775

[45] July 5, 1977

[54] PROCESS FOR PRODUCING ALUMINOUS KEATITE CERAMICS

[75] Inventor: David G. Grossman, Corning, N.Y.

[73] Assignee: Corning Glass Works, Corning, N.Y.

[22] Filed: Sept. 20, 1976

[21] Appl. No.: 724,985

[52] U.S. Cl. .............................. 106/39.7; 65/30 E
[51] Int. Cl.² ................... C03C 3/22; C03C 21/00; C03C 3/04
[58] Field of Search ................... 106/39.7; 65/30 E

[56] References Cited

UNITED STATES PATENTS 3,834,981 9/1974 Grossman et al. ................ 106/39.7
3,985,533 10/1976 Grossman ........................ 106/39.7

*Primary Examiner*—Winston A. Douglas
*Assistant Examiner*—Mark Bell
*Attorney, Agent, or Firm*—Kees van der Sterre; Clinton S. Janes, Jr.; Clarence R. Patty, Jr.

[57] ABSTRACT

In a process for producing aluminous keatite ceramics by the hydrogen-for-lithium ion-exchange treatment of non-porous glass-ceramics, the efficiency of the lithium extraction step is substantially improved if beta-spodumene glass-ceramics having an $Al_2O_3$:modifying oxide ratio not exceeding about 1:1 are selected as starting materials.

4 Claims, No Drawings

PROCESS FOR PRODUCING ALUMINOUS KEATITE CERAMICS

BACKGROUND OF THE INVENTION

Beta-spodumene and beta-spodumene solid solutions are crystalline aluminosilicates of tetragonal structure which form a major component of many important ceramic and glass-ceramic products. Glass compositions stoichiometric of beta-spodumene ($Li_2O.Al_2O_3.4SiO_2$) or solid solutions thereof with silica ($Li_2O.Al_2O_3.nSiO_2$, wherein n ranges from about 3.5–10) exhibit acceptable melting and forming characteristics; yet ceramic products comprising these crystals can be refractory and quite low in thermal expansion.

The crystal chemistry of beta-spodumene solid solutions is described by B. J. Skinner and H. T. Evans, Jr. in Am. J. Sci., Bradley Vol. 258A, pp. 312–24 (1960). The manufacture of nonporous glass-ceramic articles comprising beta-spodumene solid solution as a principal crystal phase by the controlled crystallization in situ of lithium aluminosilicate glasses is reported by Stookey in U.S. Pat. No. 2,920,971. Other beta-spodumene glass-ceramics are described by Voss et al. in U.S. Pat. No. 3,148,894 and Bruno et al. in U.S. Pat. No. 3,582,371.

The extraction of lithium from mineral beta-spodumene by a hydrogen-for-lithium ion exchange process has been known since at least 1950, being described by Ellestad et al. in U.S. Pat. No. 2,516,109. More recently, Grossman et al. disclosed in U.S. Pat. No. 3,834,981 that lithium may be extracted from unitary ceramic articles comprising beta-spodumene solid solution crystals by the same hydrogen-for-lithium ion exchange. This extraction process is non-destructive, and provides a ceramic product comprising a new crystal phase, termed aluminous keatite, consisting of alumina and silica in proportions corresponding to that of the original composition.

Briefly, the process described in the aforementioned Grossman et al. patent comprises the steps of contacting a selected beta-spodumene-containing ceramic article with a strong mineral acid to replace at least some of the lithium present in the crystals with hydrogen. Thereafter the ceramic article is heated to provide aluminous keatite crystals through the removal of at least some of the water of crystallization therefrom.

Either sintered ceramics or thermally-crystallized glass-ceramics may be selected as starting materials for the production of aluminous keatite-containing ceramics by the above ion-exchange process. However, sintered, typically porous ceramics or glass-ceramics have previously been preferred as starting materials, particularly if free of interstitial glass, because the porous structure provides ready access to the spodumene crystals by the acid treating medium.

Glass-ceramic articles provided by the in situ crystallization of preformed glass articles are ordinarily non-porous and free of voids. Moreover, such articles often include a minor glassy phase or matrix encasing the beta-spodumene crystals which may significantly reduce the rate of ion-exchange. Thus Grossman et al. suggest, in their patent, the use of agents such as HF and NaOH to remove glassy phases prior to or during the ion-exchange treatment, in order to accelerate lithium removal by exposing the beta-spodumene crystals to the acid medium.

SUMMARY OF THE INVENTION

I have now discovered an improvement in the above described process of producing aluminous keatite ceramic articles by the acid treatment of beta-spodumene glass-ceramics, mainly relating to processes wherein non-porous glass-ceramics produced by the crystallization in situ of glass articles constitute the selected starting material. The invention principally resides in controlling the composition of the beta-spodumene starting material to provide significantly improved lithium extraction rates even from solid non-porous beta-spodumene glass-ceramics.

Specifically, I have found that the production of aluminous keatite ceramics may be considerably facilitated by selecting as the starting material a beta-spodumene glass-ceramic article having a composition wherein the mole ratio of alumina to the total content of modifying metal oxides does not exceed about 1:1. By total modifying metal oxide content is meant the total content of $Li_2O$ plus any other alkali metal and second group metal oxides which may be included in beta-spodumene glass-ceramics in certain instances to modify the properties of the product or of the parent glass. Specifically, the total molar proportion of the modifying oxides $Li_2O$, $Na_2O$, $K_2O$, ZnO, MgO, CaO, BaO and SrO must be maintained at a level at least equivalent to the molar proportion of $Al_2O_3$ present in the composition to obtain the improved results hereinafter described.

The exact reason for the anomalous ion-exchange behavior of beta-spodumene glass ceramics comprising the aforementioned modifying oxides in the required total molar proportions is not fully understood. Presumably the relationship between the alumina and total modifying oxide content of the composition in some way affects either the ion-exchange behavior of the spodumene crystals or the leaching characteristics of the interstitial (matrix) glass. In any event, the processing advantages attending the production of aluminous keatite ceramics in accordance with my improved method are of significant economic importance. These advantages include substantially decreased processing time as well as the avoidance of special glass removal steps requiring the use of strong alkalies or hydrofluoric acid.

DETAILED DESCRIPTION

The process of providing aluminous keatite ceramics by the ion-exchange of beta-spodumene glass-ceramics comprises the initial step of contacting the glass-ceramic with a source of exchangeable hydrogen ions, such as a strong acid. Preferred sources of exchangeable hydrogen are the strong mineral acids $H_2SO_4$, HCL and $HNO_3$, or aqueous solutions thereof. Contact between the acid and the glass-ceramic is carried out by immersing the glass-ceramic in the acid medium for a time sufficient to permit the desired exchange of hydrogen ions for lithium ions in the beta-spodumene crystal phase. The ion-exchange reaction is temperature dependent such that increased reaction rates may be obtained by carrying out the immersion at temperatures above room temperature but, preferably, below the normal boiling temperature of the selected acid.

The product of the ion-exchange process is a ceramic article comprising a hydroxy aluminosilicate crystal phase in place of the original beta-spodumene crystal phase, $H_2O$ having been substituted for $Li_2O$ in the crystals during the process. The production of an aluminous keatite ceramic from this intermediate article requires a heating step to drive the water from the crystal phase, leaving a residual aluminosilicate phase which constitutes the desired aluminous keatite. Evolution of this water of crystallization typically commences at a temperature of about 350° C., with the extent of removal depending primarily upon the peak temperature reached during heating. Essentially complete removal of this water of crystallization requires heating to a temperature on the order of about 1000° C.

The aluminous keatite product resulting from this heating exhibits a number of useful properties, including low reactivity at elevated temperatures and, typically, a negative coefficient of thermal expansion. The product is also a useful intermediate for the production of mullite and aluminous keatite-mullite ceramics exhibiting useful chemical and physical properties.

Of course, the above-described steps are merely illustrative of the procedures which are customarily employed in the manufacture of aluminous keatite ceramics. For a further description, the aforementioned U.S. Pat. No. 3,834,981 to Grossman et al. may be consulted, and that patent is expressly incorporated herein by reference for a detailed explanation of this process.

The criticality of composition, and particularly the alumina:modifying oxide ratio, to ion-exchange rate in non-porous beta-spodumene glass-ceramics produced by the in situ crystallization of lithium aluminosilicate glasses may be illustrated by comparing the extent of lithium extraction from glass-ceramics of varying composition but identical configuration utilizing a standardized ion-exchange process. For this purpose a series of glass-ceramic articles comprising conventional quantities of silica and nucleating agents but varying molar proportions of alumina and modifying oxides may be provided.

The beta-spodumene glass-ceramics to be used for the production of the aluminous keatite products for this purpose are prepared in accordance with conventional practice by compounding glass batches composed of standard glass batch constituents in proportions yielding products of the desired compositions at the temperature utilized for the melting of the batch. Typical basic batch materials include 200 mesh sand, lithium carbonate, sodium carbonate, aluminum oxide, titanium oxide and zirconium oxide.

The batches thus provided are typically dry ball-milled to assure a homogeneous melt and then melted in platinum crucibles by heating at temperatures in the range of about 1650°–1680° C. for an interval of approximately 16 hours. Glass cane about ¼ inch in diameter is then drawn from each melt and annealed at a temperature in the range of about 650°–680° C.

Glass cane produced as described is converted to beta-spodumene glass-ceramic cane by a conventional heat treatment to promote crystallization in situ of the glass. For this purpose a heat treatment comprising heating at a rate of 200° C. per hour to a peak temperature of 1150° C. with a 2 hour hold at 1150° C. is employed. The resulting products are highly crystalline, non-porous beta-spodumene glass-ceramics, free of voids.

The suitability of each glass-ceramic product for ion-exchange processing is evaluated by exposure to a standardized ion-exchange treatment comprising immersion in concentrated $H_2SO_4$ at a temperature of 260° C. for a time interval of 16 hours. The effect of this treatment on each glass-ceramic product is determined by ascertaining the depth of the hydroxy aluminosilicate crystal layer produced on the surface of each glass-ceramic product by the exchange of hydrogen for lithium therein. The depth of this ion-exchanged layer is evident from the change in translucency of the material. Notwithstanding the fact that the beta-spodumene glass-ceramics utilized as starting materials in the process are virtually indistinguishable prior to treatment, substantial differences in the depths of the ion-exchanged layer produced by the treatment are observed. These differences are largely dependent upon the alumina: modifying oxide mole ratio of the starting composition.

Typical results for an evaluation of related beta-spodumene glass-ceramics in accordance with the above procedures are reported in Table I below. Included in Table I are the compositions of the beta-spodumene glass-ceramic starting materials and the depths of the ion-exchange layers produced on each of the materials after exposure to concentrated $H_2SO_4$ at 260° C. for 16 hours. The compositions of the beta-spodumene glass-ceramics are reported on the basis of molar proportions, except for the nucleating agents $TiO_2$ and $ZrO_2$ which are reported as weight percent in excess of the other composition constituents.

For convenience in comparing compositions, the molar proportions of the various constituents are normalized such that the total modifying oxide content of each composition totals 1. As an illustration, the first composition in Table I contains modifying oxides ($Li_2O$ + $Na_2O$), $Al_2O_3$ and $SiO_2$ in the molar proportions 1:1:4.5; the second composition contains these same constituents in the proportions 1:1.05:4.5. Thus the $Al_2O_3$:modifying oxide mole ratios for each of these compositions can be determined by inspection from Table I as 1:1 for the first composition and 1.05:1 for the second.

TABLE I $H^+$ Exchange Rate Beta-Spodumene Glass-Ceramics

| | Base Composition | | | | Nucleating Agents | | Ion-Exchange Layer |
|---|---|---|---|---|---|---|---|
| | $Li_2O$ | Other Modifier | $Al_2O_3$ | $SiO_2$ | $TiO_2$ | $ZrO_2$ | Depth (mm) |
| 1 | .85 | .15 $Na_2O$ | 1.00 | 4.5 | 2 | 2 | 1.0 |
| 2 | .80 | .20 $Na_2O$ | 1.05 | 4.5 | 2 | 2 | 0.2 |
| 3 | .75 | .25 $Na_2O$ | 1.05 | 4.5 | 2 | 2 | 0.2 |
| 4 | .90 | .10 $Na_2O$ | 1.10 | 4.5 | 2 | 2 | 0.2 |
| 5 | .85 | .15 $Na_2O$ | 1.15 | 4.5 | 2 | 2 | 0.0 |
| 6 | .75 | .25 $Na_2O$ | 1.00 | 6.5 | 2 | 2 | 0.7 |
| 7 | .85 | .15 $Na_2O$ | 1.00 | 4.5 | 2 | 2 | 1.3 |
| 8 | .85 | .15 $Na_2O$ | 1.00 | 5.0 | 2 | 2 | 1.0 |
| 9 | .85 | .15 $Na_2O$ | 1.00 | 5.5 | 2 | 2 | 1.0 |
| 10 | .80 | .20 $Na_2O$ | 1.00 | 4.5 | 2 | 2 | 1.0 |
| 11 | .80 | .20 $Na_2O$ | 1.00 | 4.5 | 1.5 | 2 | 1.3 |
| 12 | .80 | .20 $Na_2O$ | 1.00 | 5.0 | 2 | 2 | 0.5 |

TABLE I-continued

| | H+ Exchange Rate Beta-Spodumene Glass-Ceramics | | | | | | |
|---|---|---|---|---|---|---|---|
| | Base Composition | | Nucleating Agents | | | | Ion-Exchange Layer |
| | Li₂O | Other Modifier | Al₂O₃ | SiO₂ | TiO₂ | ZrO₂ | Depth (mm) |
| 13 | .70 | .30 Na₂O | 1.00 | 5.0 | 3 | 2 | 0.5 |
| 14 | .60 | .40 Na₂O | 1.00 | 5.0 | 6.0 | — | 0.5 |
| 15 | .85 | .15 Na₂O | 1.00 | 6.5 | 2 | 2 | 0.9 |
| 16 | .85 | .15 Na₂O | 1.00 | 7.0 | 2 | 2 | 1.0 |
| 17 | .85 | .15 Na₂O | 1.00 | 6.0 | 2 | 2 | 0.7 |
| 18 | .90 | .10 Na₂O | 1.00 | 4.5 | 2 | 2 | 1.0 |

The effect of the Al₂O₃:modifier mole ratio on ion-exchange rate is clearly illustrated by Examples 1–5 in described for the production of the glass-ceramics described in Table 1.

TABLE II

| | H+ Exchange Rate Beta-Spodumene Glass-Ceramics | | | | | | |
|---|---|---|---|---|---|---|---|
| | Base Composition | | Nucleating Agents | | | | Ion-Exchange Layer |
| | Li₂O | Other Modifiers | Al₂O₃ | SiO₂ | TiO₂ | ZrO₂ | Depth (mm) |
| 19 | .80 | .15 Na₂O/ .05 K₂O | 1.00 | 4.5 | 2 | 2 | 0.3 |
| 20 | .90 | —   .10 K₂O | 1.00 | 5.0 | 2 | 2 | 0.3 |
| 21 | .80 | —   .20 K₂O | 1.00 | 5.0 | 2 | 2 | 0.9 |
| 22 | .85 | .10 Na₂O/ .05 ZnO | 1.00 | 6.0 | 2 | 2 | 0.4 |
| 23 | .80 | .10 Na₂O/ .10 ZnO | 1.00 | 6.0 | 2 | 2 | 0.4 |
| 24 | .80 | —   .20 ZnO | 1.00 | 5.0 | 2 | 2 | 0.3 |
| 25 | .80 | .10 Na₂O/ .10 MgO | 1.00 | 6.0 | 2 | 2 | 0.4 |
| 26 | .80 | .15 Na₂O/ .05 MgO | 1.00 | 5.0 | 2 | 2 | 0.4 |
| 27 | .80 | .10 Na₂O/ .10 MgO | 1.00 | 5.0 | 2 | 2 | 0.4 |
| 28 | .80 | —   .20 MgO | 1.00 | 5.0 | 2 | 2 | 0.3 |
| 29 | .75 | .15 Na₂O/ .10 MgO | 1.00 | 5.0 | 2 | 2 | 0.3 |
| 30 | .80 | .10 Na₂O/ .10 CaO | 1.00 | 5.0 | 2 | 2 | 0.8 |
| 31 | .80 | .10 Na₂O/ .10 SrO | 1.00 | 5.0 | 2 | 2 | 0.9 |
| 32 | .80 | .10 Na₂O/ .10 BaO | 1.00 | 5.0 | 2 | 2 | .02 |

Table I, showing the marked reduction in depth of ion-exchange layer accompanying an increase in this ratio from 1:1 to 1.15:1. On the other hand, as illustrated by Examples 6–18 in Table I, relatively small changes in ion-exchange rate are produced by other compositional variations such as the concentration of SiO₂, the relative concentrations of Li₂O and Na₂O, and the nature and amount of the nucleating agents employed.

The data in Table I tends to support the conclusion that solid glass-ceramics having compositions characterized by Al₂O₃:modifying oxide ratios of 1:1 or less can be very effectively treated in H₂SO₄ alone, conversely compositions higher in Al₂O₃ appear to require extended treatments, and in some cases probably even the use of supplemental HF or alkaline treating agents, in order to provide useful ion-exchange results.

Beta-spodumene glass-ceramics such as shown in Table I, wherein the modifying oxides includes Na₂O, are preferred from the standpoint of processing in accordance with the invention. However, glass-ceramic articles comprising any of the alternative modifying oxides previously mentioned also exhibit good ion-exchange behavior provided the Al₂O₃: modifying oxide ratio is maintained at 1:1 or below.

Examples of non-porous beta-spodumene glass-ceramics containing these alternative modifiers are set forth in Table II below. Included in Table II are the compositions of the glass-ceramics treated, expressed on the basis of molar proportions as in Table I, and the depths of the ion-exchanged layers produced by treatment with H₂SO₄ according to the standardized ion-exchange treatment above described. The nucleating agents are again reported on a weight percent in excess basis. All of the beta-spodumene glass-ceramics shown are solid non-porous glass-ceramics which are produced by the in situ crystallization of glass articles in accordance with the same procedures and treatments described for the production of the glass-ceramics described in Table 1.

From data such as set forth in Table II it is determined that the use of K₂O, MgO, BaO, CaO, SrO and ZnO to provide the required modifying oxide concentrations also produces glass-ceramics exhibiting improved ion-exchange characteristics in accordance with the invention. The data suggests that SrO and CaO are the most effective modifiers for this purpose, whereas ZnO, BaO and MgO appear to somewhat retard the rate of ion-exchange. For this reason beta-spodumene glass-ceramics wherein the molar ratio of the alumina content to the total content of MgO + BaO + ZnO does not exceed about 1:0.3 are preferred.

Although the foregoing description and examples are provided with particular reference to solid, non-porous beta-spodumene glass-ceramics produced by the in situ crystallization of glass articles, it will be recognized that the improvements in processing efficiency obtained in accordance with the invention might also be obtained where porous ceramics and glass-ceramics comprising residual glassy phases are to be treated. Thus the methods herein described may well be advantageously applied in the treatment of sintered beta-spodumene ceramic and glass-ceramic articles to provide aluminous keatite products as above set forth.

I claim:

1. In a process for the manufacture of an aluminous keatite-containing ceramic article wherein a ceramic article selected for treatment, comprising a principal crystal phase composed of beta-spodumene solid solution, is first contacted with a strong acid to replace at least some of the lithium ions therein with hydrogen, and thereafter heated to provide aluminous keatite through the removal of at least some of the water of crystallization therefrom, the improvement which comprises selecting as the ceramic article for treatment an article wherein the mole ratio of Al₂O₃ to modifying oxides selected from the group consisting of Li₂O, Na$_2$O, K$_2$O, ZnO, MgO, CaO, BaO and SrO does not exceed about 1:1.

2. A process in accordance with claim 1 wherein the ceramic article selected for treatment is a non-porous glass-ceramic article produced by the in situ crystallization of a glass.

3. A process in accordance with claim 1 wherein the molar ratio of the alumina content to the total content of MgO + BaO + ZnO in the ceramic article selected for treatment does not exceed about 1:0.3.

4. A process in accordance with claim 1 wherein the modifying oxides in the ceramic article selected for treatment include Na$_2$O.

* * * * *